(No Model.)
G. S. ROMINGER.
Mechanical Movement.
No. 237,703. Patented Feb. 15, 1881.
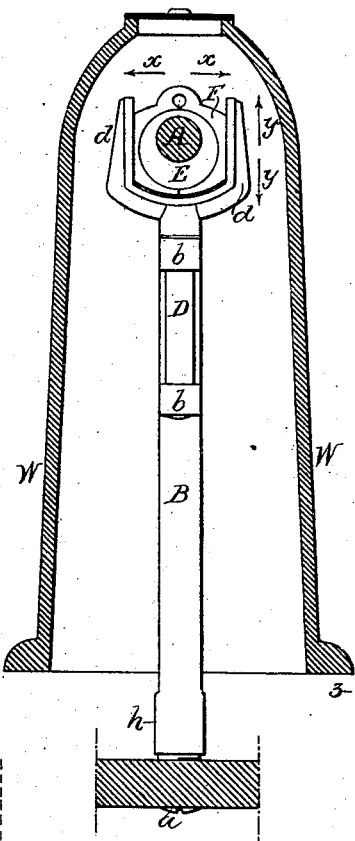
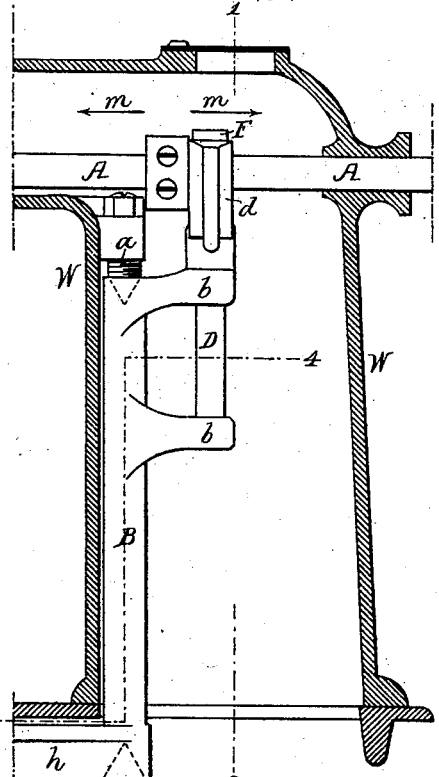
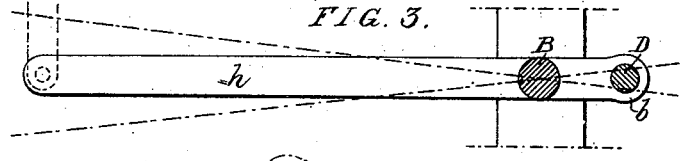
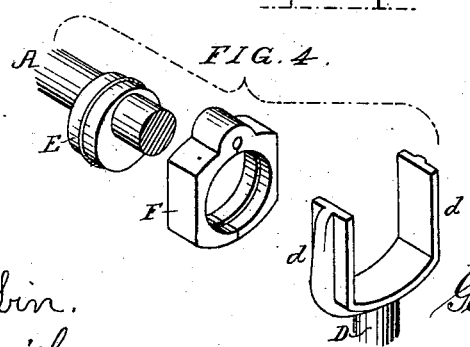
Witnesses:
James F. Tobin.
Harry Smith
Inventor:
George S. Rominger
by his Attorneys
Howson and Son
N. PETERS, PHOTO-LITHOGRAPHER, WASHINGTON, D. C.

UNITED STATES PATENT OFFICE.

GEORGE S. ROMINGER, OF PHILADELPHIA, PENNSYLVANIA, ASSIGNOR TO THE AMERICAN BUTTONHOLE, OVERSEAMING AND SEWING MACHINE COMPANY, OF SAME PLACE.

MECHANICAL MOVEMENT.

SPECIFICATION forming part of Letters Patent No. 237,703, dated February 15, 1881.

Application filed December 20, 1880. (No model.)

*To all whom it may concern:*

Be it known that I, GEORGE S. ROMINGER, a citizen of the United States, residing in Philadelphia, Pennsylvania, have invented a new Mechanical Movement, of which the following is a specification.

My invention consists of a device, described hereinafter, for converting a rotary motion into a vibrating or reciprocating motion, the device being applicable to the operating of a shuttle from the driving-shaft of a sewing-machine or to the actuating of the slide-valve of a steam-engine from a rotating shaft. In fact, the device may be adopted in many different machines where a vibrating motion has to be imparted to a shaft at right angles to a driving-shaft.

In the accompanying drawings, Figure 1 is a side view of the device; Fig. 2, a vertical section on line 1 2; Fig. 3, a sectional plan on the line 3 4; and Fig. 4, views of parts of the device detached from each other.

A is the driving-shaft, arranged to revolve in bearings on the frame of any machine to which my invention may be applied.

B is a shaft to which a vibrating motion has to be imparted, and which is arranged at right angles to the driving-shaft. This shaft B has its bearings, in the present instance, on pointed studs $a$ $a$, and I prefer these bearings when the device has to be applied to light and fast-running machinery.

Arms $b$ $b$ project from the vertical shaft B, and form bearings for the vertical spindle D, which is parallel with the shaft B.

To the shaft A is secured an eccentric, E, a detached view of which is shown in perspective in Fig. 4, and this eccentric is arranged to fit snugly, but turn freely, in a sliding block, F, also shown in perspective in Fig. 4, this block being adapted to parallel guides $d$ $d$ on the upper end of the vertical spindle D.

It should be understood that the sliding block, although the eccentric can turn freely in it, is always maintained laterally in the same position on the eccentric. This may be done in different ways. For instance, if the device is used in connection with light machinery, the sliding block may be so far split (Fig. 4) that it can be sprung open so as to be passed over a rib on the eccentric, the said rib fitting in an annular groove in the block when the latter resumes its normal condition. On turning the shaft two reciprocating movements must necessarily be imparted to the sliding block—one movement in the direction of the arrows $x$ $x$, Fig. 2, and the other in the direction of the arrows $y$ $y$—and a vibrating motion must be imparted to the shaft B, carrying with it the spindle D. The latter oscillates in the arc of a circle the center of which is in the axis of the shaft B. Hence the bearings $b$ $b$ must oscillate on the spindle D, the latter being prevented from turning by the sliding block. At the same time as the guides at the upper end of the spindle are moved to and fro in the arc of a circle these guides must necessarily slide to and fro in the direction of the arrows $m$ $m$, Fig. 1, on the sliding block.

In the present instance I have shown the device as applied to a sewing-machine, of which W is part of the frame, an arm, $h$, at the lower end of the shaft B having a vibrating motion, which renders it available as a means of driving the shuttle; or the arm may be connected to a slide-valve or to any other object to which a reciprocating motion has to be imparted.

I claim as my invention—

A mechanical movement in which a driving-shaft carrying an eccentric and a sliding block is combined with a shaft, B, carrying a spindle having guides adapted to the said sliding block, all substantially as set forth.

In testimony whereof I have signed my name to this specification in the presence of two subscribing witnesses.

GEO. S. ROMINGER.

Witnesses:
JAMES F. TOBIN,
HARRY SMITH.